United States Patent
Hamada et al.

(10) Patent No.: US 9,760,611 B2
(45) Date of Patent: Sep. 12, 2017

(54) IDENTIFYING ELEMENT RELATIONSHIPS IN A DOCUMENT

(71) Applicant: INTERNATIONAL BUSINESS MACHINES CORPORATION, Armonk, NY (US)

(72) Inventors: Seiji Hamada, Tokyo (JP); Yutaka Moriya, Tokyo (JP); Tadahiko Nakamura, Yokohama (JP); Masaki Wakao, Sagamihara (JP); Takeshi Watanabe, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 490 days.

(21) Appl. No.: 14/184,358

(22) Filed: Feb. 19, 2014

(65) Prior Publication Data

US 2014/0250149 A1    Sep. 4, 2014

(30) Foreign Application Priority Data

Mar. 1, 2013  (JP) ................................ 2013-040514

(51) Int. Cl.
*G06F 17/30* (2006.01)

(52) U.S. Cl.
CPC .. *G06F 17/30539* (2013.01); *G06F 17/30253* (2013.01)

(58) Field of Classification Search
CPC ................... G06F 17/30539; G06F 17/30253
See application file for complete search history.

(56) References Cited

U.S. PATENT DOCUMENTS

| 8,671,341 | B1* | 3/2014 | Hellwig | G06F 17/27 704/4 |
|---|---|---|---|---|
| 2002/0194201 | A1* | 12/2002 | Wilbanks | G06F 19/709 |
| 2004/0167870 | A1* | 8/2004 | Wakefield | G06F 17/30569 |
| 2004/0177053 | A1* | 9/2004 | Donoho | G06Q 40/00 706/47 |
| 2005/0276479 | A1* | 12/2005 | Goldberg | G06Q 10/10 382/181 |
| 2007/0198249 | A1* | 8/2007 | Adachi | G06F 17/2705 704/9 |
| 2008/0147586 | A1* | 6/2008 | Kitayama | G06Q 10/06 706/47 |
| 2009/0048823 | A1* | 2/2009 | Liu | G06F 17/2765 704/9 |

(Continued)

FOREIGN PATENT DOCUMENTS

| JP | 2001273164 A | 10/2001 |
|---|---|---|
| JP | 2003044492 A | 2/2003 |

(Continued)

*Primary Examiner* — Shiow-Jy Fan
(74) *Attorney, Agent, or Firm* — Law Office of Jim Boice

(57) ABSTRACT

An information processing apparatus includes a text mining section configured to perform text mining on text data acquired from the outside and to output extracted information; an identification section configured to search a development database storing elements constituting a product and the relationship among the elements by using the information extracted by text mining to identify an element related to the information; and a notification section configured to notify the identified element to a user, a program for use in the information processing apparatus.

14 Claims, 11 Drawing Sheets

(56) References Cited

U.S. PATENT DOCUMENTS

2009/0094174 A1\* 4/2009 Kussmaul ......... G06F 17/30592
      706/12
2011/0010373 A1\* 1/2011 Ishikawa ............. G06F 17/2211
      707/749

FOREIGN PATENT DOCUMENTS

| JP | 2005182465 A | 7/2005 |
|----|--------------|--------|
| JP | 2008090762 A | 4/2008 |

\* cited by examiner

INFORMATION EXTRACTED FROM EXTERNAL DB (FIRST TIME)

KEYWORD: CRUISE CONTROL
TREND INDEX: 10.3059
RELEVANT KEYWORD
PRODUCT NAME (VEHICLE TYPE): XX1, XX2, YY1, YY2
COMMON KEYWORD:

FIG. 6

INFORMATION EXTRACTED FROM EXTERNAL DB (SECOND TIME)

KEYWORD: CRUISE CONTROL + DEACTIVATION SWITCH
TREND INDEX: 10.3059
RELEVANT KEYWORD
  PRODUCT NAME (VEHICLE TYPE): XX1, XX2, YY1, YY2
  COMMON KEYWORD: DEACTIVATION(44.0), NO LIGHT EMISSION(9.5), FIRE(12.7) ...

IDENTIFYING ELEMENT RELATIONSHIPS IN A DOCUMENT

This application is based on and claims the benefit of priority from Japan (JP) Patent Application 2013-040514, filed on Mar. 1, 2013, and herein incorporated by reference in its entirety.

BACKGROUND

The present invention relates to an apparatus and a method for information processing and a program for the same.

There is a known method for a manufacturer to find the cause of a problem in a product on the bases of problem data about the product received from a dealer to generate the result of finding. However, there is no known method for automatically identifying an element that causes the problem from product information, such as problem data, and notifying the user of the element.

SUMMARY

In one embodiment of the present invention, an information processing apparatus comprises: a text mining hardware device configured to perform text mining on text data acquired from an external source and to output extracted information; an identification hardware device configured to search a development database storing elements constituting a product and a relationship among elements of the text data by using the extracted information extracted by text mining to identify an element related to the extracted information; and a notification hardware device configured to notify a user of an identified element.

In one embodiment of the present invention, an information processing apparatus comprises: an acquisition hardware device configured to acquire at least one element from development database storing elements constituting a product and a relationship among elements in the development database; a setting hardware device configured to set an acquired element as an analysis target keyword for text mining; a text mining hardware device configured to perform text mining on externally acquired text data by using the analysis target keyword to extract information related to an element acquired from the development database; and a notification hardware device configured to notify a user of information related to an element acquired by text mining in association with at least one element acquired from the development database.

In one embodiment of the present invention, a method for information processing comprises: acquiring, by one or more processors, at least one element from a development database storing elements constituting a product and a relationship among the elements in the development database; setting, by one or more processors, an acquired element as an analysis target keyword for text mining; performing text mining, by one or more processors, on externally acquired text data by using the analysis target keyword to extract information related to an element acquired from the development database; and notifying, by one or more processors, a user of information related to an element acquired by text mining in association with the element acquired from the development database.

BRIEF DESCRIPTION OF THE SEVERAL VIEWS OF THE DRAWINGS

FIG. 6 is a diagram illustrating an example of information that a text mining section 110 provides to an identification section 124.

FIG. 10 is a diagram illustrating an example of information that the text mining section 110 provides to the identification section 124.

DETAILED DESCRIPTION

The present invention will be described hereinbelow on the based of an embodiment of the present invention; however, it is to be understood that the embodiment does not limit the scope of the claims of the present invention and that all of the features described in the embodiment are not absolutely necessary for the solutions of the present invention.

Figure 1:
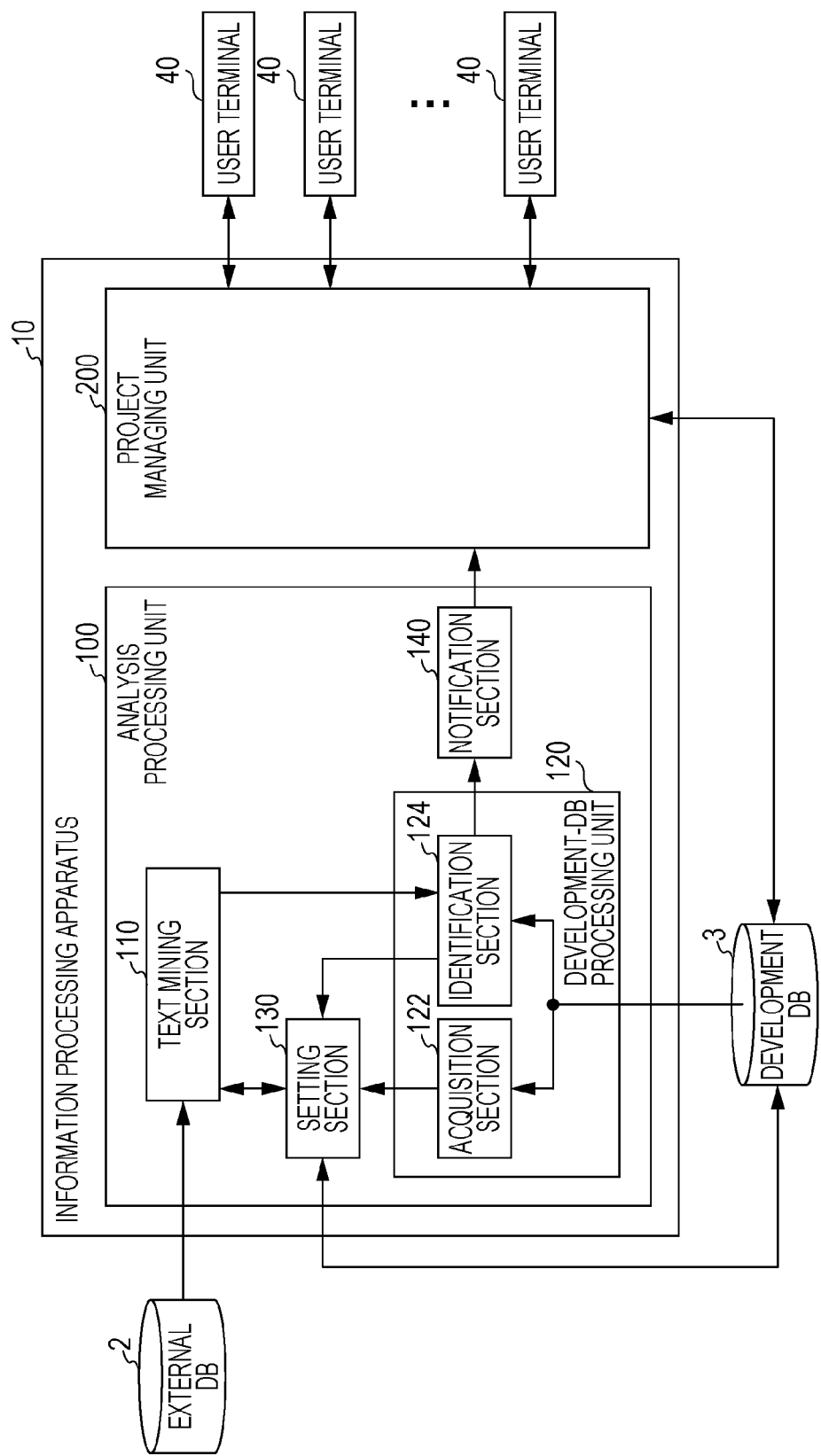
FIG. 1 is a diagram illustrating the configuration of an information processing apparatus 10 of an embodiment of the present invention.

FIG. 1 shows the configuration of an information processing system 1 of this embodiment. The information processing system 1 searches a development database 3 on the basis of the result of text mining on the external database 2 to identify an element of a product related to a problem or a request (for example, parts of the product, a component constituted by two or more parts, the function of the product, and/or software) and notifies the element to a user. The information processing system 1 includes an external database 2, a development database 3, an information processing apparatus 10, and one or more user terminals 40.

The external database 2 is a database outside the information processing apparatus 10 and receives a report on a product (hereinafter referred to as "product report"), stores the text data of the product report, and publishes the test data. For example, the external database 2 stores a document in which identification information on products, such as a car and electrical equipment (for example, product name and/or product model) and requests, evaluations, and/or failures or faults during manufacture and/or in use are described in a predetermined format.

The development database 3 stores development data on a product and publishes the development data. For example, the development database 3 stores information of a plurality of elements that constitute the product, information on at least one of the design, production, testing, and support of the elements, and information on the relationship among the plurality of elements (including the connection relationship, hierarchical relationship, correspondence relationship, and/or dependency relationship among the plurality of elements). The development database 3 may further store the levels of importance of the plurality of elements in association the individual elements.

The information processing apparatus 10 executes information processing for identifying an element of a product related to a problem of or a request for the product. The information processing apparatus 10 includes an analysis processing unit 100 and a project managing unit 200.

The analysis processing unit 100 performs text mining on the text data in the external database 2 by using a predetermined keyword and searches the development database 3 by using extracted information to identify an element of the product related to the keyword used in text mining from the development data. The analysis processing unit 100 notifies the identified element to the project managing unit 200.

The analysis processing unit 100 includes a text mining section 110, a development-database processing unit 120, a setting section 130, and a notification section 140.

The text mining section 110 performs text mining on text data acquired from the outside by using an analysis target keyword to extract information in which a problem in a product is described or information in which a request for the product is described and outputs the extracted information. The text mining section 110 may be implemented by a text mining tool, such as IBM Content Analytics (ICA), for example.

For example, the text mining section 110 acquires the text data of a plurality of product reports from the external database 2 and acquires the frequency of appearance of an analysis target keyword, such as the name of a part of the product, in the acquired text data.

Furthermore, the text mining section 110 extracts another keyword that appears together with the analysis target keyword in the text data. The text mining section 110 provides the information on the analysis target keyword and the extracted keyword to the development-database processing unit 120.

The development-database processing unit 120 identifies an element of the product included in the development database 3 on the basis of the information received from the text mining section 110. The development-database processing unit 120 includes an acquisition section 122 and an identification section 124.

The acquisition section 122 acquires at least one element from the development database 3 to use the element as a keyword for text mining. For example, the acquisition section 122 acquires information, such as the name of at least one of main parts that constitute the product from the development database 3 and provides the information to the setting section 130.

The identification section 124 receives the information extracted by the text mining section 110, searches the development database 3 by using the information, and identifies an element related to the information. The identification section 124 provides the information of the identified element to the setting section 130 and the notification section 140.

The setting section 130 sets the element that the acquisition section 122 acquired as an analysis target keyword for the text mining of the text mining section 110. Furthermore, the setting section 130 receives the information of the identified element from the identification section 124 and adds the element identified by the identification section 124 as another keyword for text mining to the analysis target keyword that is already set.

The notification section 140 receives the information of the identified element from the identification section 124 and provides the information to the project managing unit 200. Thus, the notification section 140 notifies the identified element to the user of the user terminal 40 via the project managing unit 200.

The project managing unit 200 manages a project for product management, such as the design, production, testing, and/or support of the product, in the development database 3 by using a project management program. For example, the project managing unit 200 may manage assignment of tasks included in the project (for example, the task of designing elements of the product and the task of testing the elements of the product) and task scheduling. The project managing unit 200 may use, for example, IBM Rational Engineering Lifecycle Manager (RELM), as a project management program.

Furthermore, the project managing unit 200 communicates with the user terminal 40 to notify the user terminal 40 of the element that the identification section 124 identified. The project managing unit 200 creates the task of requesting, of users who are the developer and the manufacturer of the product, a user who takes charge of the identified element to check the element and gives the task to a project management program that the user uses.

The user terminal 40 receives the information on the task from the project managing unit 200 of the information processing apparatus 10 and the information of the element that the identification section 124 specified and displays the information to the user. Furthermore, the user terminal 40 receives an input from the user and provides the input to the information processing apparatus 10. The user terminal 40 may be a personal computer, a mobile information terminal, or the like.

As described above, the information processing apparatus 10 of this embodiment performs text mining on a product report or the like using a part of the product or the like as a keyword and searches the development database 3 by using the extracted information. Thus, the information processing apparatus 10 can identify an element related to an event that frequently appears in the product report on the basis of the development data.

The information processing apparatus 10 notifies an identified element to the user, sets the element as an analysis target keyword for text mining, and/or generates the task of requesting the user to check the element. This allows the information processing apparatus 10 to make the user check the identified element while improving the accuracy of identification of the element.

Figure 2:
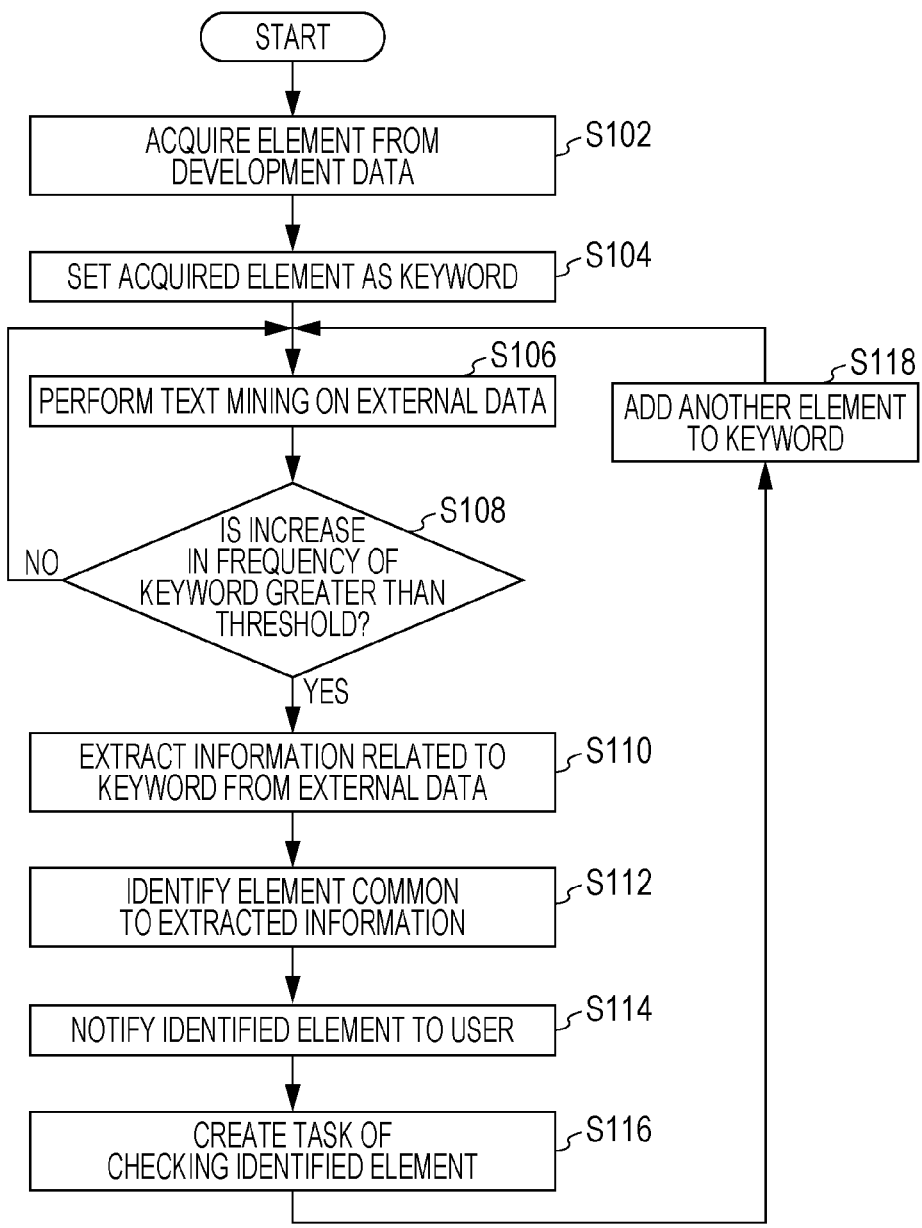
FIG. 2 is a flowchart illustrating the process of the information processing apparatus 10 of the embodiment.

FIG. 2 is a flowchart of the process of the information processing apparatus 10 of this embodiment. In this embodiment, the information processing apparatus 10 executes the process from S102 to S118.

First, in S102, the acquisition section 122 acquires one or a plurality of elements of the main parts and so on of the product from the development database 3 and provides the element(s) to the setting section 130. For example, the acquisition section 122 acquires "cruise control" from the main elements of a vehicle. The acquisition section 122 provides the acquired element to the setting section 130.

Next, in S104, the setting section 130 sets the element acquired from the acquisition section 122 as an analysis target keyword for text mining of the text mining section 110.

Next, in S106, the text mining section 110 performs text mining on text data acquired from the outside by using the set keyword ("cruise control"). For example, the text mining section 110 reads a product report (for example, a vehicle product report) generated, stored, or updated in a predetermined period of time (for example, the latest week) from the external database 2 and calculates the frequency of appearance of the analysis target keyword in the text data of the product report.

Next, in S108, the text mining section 110 determines whether the rate of increase in the frequency of appearance of the analysis target keyword in the text data is higher than a threshold value. For example, the text mining section 110 records the frequency of appearance of the analysis target keyword in the text data at fixed time intervals (for example, every week, every month, or every half year) and determines whether a value obtained by differentiating the latest frequency by the fixed time interval is higher than the predetermined threshold value. If the text mining section 110 determines that the rate of increase in the frequency is higher than the threshold value, the text mining section 110 advances the process to S110, and otherwise, returns the process to S106.

If the process is returned to S106, the text mining section 110 may perform text mining on the external database 2 with another keyword. If another analysis target keyword is not present, the text mining section 110 may terminate the process.

Next, in S110, the text mining section 110 performs text mining on the text data in the external database 2 to extract information described in relation to the analysis target keyword in the text. For example, the text mining section 110 extracts keywords that appear at high frequency (for example, "vehicle type XX1", "vehicle type XX2", "vehicle type YY1", and "vehicle type YY2"), as target keywords, together with the analysis target keyword (for example, "cruise control").

The text mining section 110 provides information on the analysis target keyword used for the extraction ("cruise control") and the extracted keywords ("vehicle type XX1" and so on) to the identification section 124 of the development-database processing unit 120.

The text mining section 110 may provide the analysis target keyword, which is the element that the acquisition section 122 acquires from the development database 3 in S102, and the information acquired by text mining to the notification section 140.

Next, in S112, the identification section 124 receives the information extracted by the text mining section 110 and searches the development database 3 by using the information as a keyword to identify an element that may be related to problems common to a plurality of products or an element that may be related in common to requests for the plurality of products.

For example, the identification section 124 identifies an element related in common to the keywords received from the text mining section 110 ("vehicle type XX1", "vehicle type XX2", "vehicle type YY1", and so on) (for example, "deactivation switch") in the development database 3.

If a plurality of identified elements is present, the identification section 124 may identify an element related to the analysis target keyword ("cruise control") of the identified elements. The identification section 124 provides the identified element to the setting section 130 and the notification section 140. Furthermore, the identification section 124 may provide the information acquired from the text mining section 110 to the notification section 140 in association with the identified element.

Next, in S114, the notification section 140 receives the information on the identified element ("deactivation switch") from the identification section 124 and provides the information to the project managing unit 200. The project managing unit 200 notifies the provided information on the element ("deactivation switch") to the user via the user terminal 40. The notification section 140 may notifies the user of the identified element and the information on the element acquired by text mining in association with the acquired element.

Next, in S116, the project managing unit 200 generates the task of requesting a user who has charge of the identified element, of the developer and the manufacturer of the product, to check the element and gives the task to a project management program that the user uses.

For example, the project managing unit 200 adds a work item related to the generated task to the information on support for the identified element included in the development database 3. The project managing unit 200 may notify the user who has charge of the identified element that the task is generated and the details of the task.

Here, the project managing unit 200 may set the level of priority of the generated task on the basis of the level of importance associated with the element identified by the identification section 124. For example, the project managing unit 200 may set the level of priority of the task of checking an element having higher importance (for example, "cruise control" related to the safety of the product) higher than the task of checking an element having lower importance (for example, "interior" that is not responsible for the safety of the product).

Alternatively, the project managing unit 200 may set the level of priority of the task of requesting to check the element on the basis of the degree of increase in frequency. For example, the project managing unit 200 may set the level of priority of the task of checking the identified element in the development database 3 on the basis of information extracted from the external database 2 related to the analysis target keyword acquired in S108 higher as the degree of increase in the frequency of the keyword increases.

Next, in S118, the setting section 130 adds the element identified by the identification section 124 as an analysis target keyword for text mining of the text mining section 110. For example, the setting section 130 adds the element that the identification section 124 identified on the basis of the information from the text mining section 110 ("deactivation switch") or an element including/constituting a part corresponding to the element as an analysis target keyword.

Furthermore, the setting section 130 may identify an element in an upper or lower layer of the element as an analysis target keyword by applying a query and/or influence analysis to the element that identification section 124 identified. For example, the setting section 130 may add an element, in the development database 3, corresponding to at least one of a larger part corresponding to the element that the identification section 124 identified and a smaller part constituting the part corresponding to the identified element as an analysis target keyword.

Furthermore, the setting section 130 may identify an element having a dependent relationship with the element that the identification section 124 identified on the development database by applying a query and/or influence analysis. For example, the setting section 130 may add a corresponding element of another product (for example, "deactivation switch (type B)") as an analysis target keyword for text mining if a part corresponding to the element that the identification section 124 identified (for example, "deactivation switch (type A)") is used in two or more products.

Alternatively, the setting section 130 may add another element associated with production data common to a part corresponding to the identified element (for example, a common production site, production process, manufacturer, and/or production date) as an analysis target keyword for text mining.

This allows the text mining section 110 to execute analysis of the external database 2 also on another element whose production process is common to the identified element. Thus, when a possibility that a problem has occurred in the product due to a specific production line is found from development data, the information processing apparatus 10 can analyze a production report or the like in more detail on the production line that has caused the problem. The setting section 130 advances the process to S106 (second or further time).

In the process of S106 (second or further time), the text mining section 110 performs text mining on text data acquired from the outside using the added target keyword ("deactivation switch") in addition to the already set target keyword ("cruise control").

Next, in S108 (second or further process), the text mining section 110 determines whether the rate of increase in the frequency of the analysis target keyword that appears in the text data is greater than the threshold value, as in the first process. For example, the text mining section 110 may determine whether the rate of increase in the frequency of the added target keyword ("deactivation switch") is greater than the threshold value.

Furthermore, for example, the text mining section 110 may determine whether the sum of the rate of increase in the frequency of the added target keyword ("deactivation switch") and the rate of increase in the frequency of the previous target keyword ("cruise control") is greater than the predetermined threshold value. Alternatively, the text mining section 110 may advance the process of S108 in the second or further time to S110.

In the process of S110 (second or further time), the text mining section 110 performs text mining on the text data acquired from the external database 2 by using the already set target keyword ("cruise control") and the added target keyword ("deactivation switch") and further outputs the extracted information.

For example, the text mining section 110 extracts keywords (for example, "vehicle type XX1", "vehicle type XX2", "vehicle type YY1", and "vehicle type YY2", "deactivation", "no light emitted", and "fire") that appear at high frequency together with the analysis target keywords ("cruise control" and "deactivation switch").

Next, in the process of S112 (second or further time), the identification section 124 searches the development database 3 by using the information extracted by text mining ("vehicle type XX1" and so on and "deactivation" and so on) as keywords to identify an element with which data including the keywords is associated, as in the first process. Here, the identification section 124 may use part (for example, "light emission") of the extracted information (for example, "no light emission") or a synonym or a near-synonym (for example, "light") thereof as a keyword.

For example, the identification section 124 separates product identification information, such as "vehicle type XX1", and information other than that from the extracted information and identifies a relevant element (for example, "LED" that constitutes "deactivation switch") common to "deactivation" and "light emission" in the product, such as "vehicle type XX1", from the development database 3. The information processing apparatus 10 executes the processes of S114 and S116 after the process of S112.

If a predetermined condition is satisfied, the information processing apparatus 10 may terminate the cycle of processes from S106 to S118. For example, if the cycle of processes from S106 to S118 is executed predetermined times, the information processing apparatus 10 may terminate the process, or alternatively, if a predetermined number of elements in cumulated total is identified in S112, the information processing apparatus 10 may terminate the process.

Furthermore, if a predetermined condition is satisfied at the execution of the cycle of processes from S106 to S118, the setting section 130 may delete part of the analysis target elements from the analysis target keywords. For example, the setting section 130 may delete an element whose number of hits on the text data in the external database 2 is smaller than a predetermined threshold value from the analysis target keywords during the text mining of the text mining section 110.

Furthermore, for example, if information that production, sale, or support of a part or a product including a specific element is terminated is acquired from the development database 3, the setting section 130 may delete the specific element from the analysis target keywords. Furthermore, for example, if the task of checking the element is generated in S116, the setting section 130 may delete the element from the analysis target keywords.

Since the method for information processing of this embodiment focuses on the rate of increase in the frequency of appearance of an analysis target keyword, as described above, the trend, such as the problem of or a request for a product, can be quickly reflected to the developing operation. With the method for information processing of this embodiment, the coverage of the second text mining onward can be optimized in accordance with the—development data by adding an element identified by the identification section 124 to the analysis target keywords for the second iteration onward.

Thus, the information processing apparatus 10 of this embodiment can improve the quality of text mining. For example, the information processing apparatus 10 can identify "LED" as the cause of a trouble related to "cruise control" in the product report.

Figure 3:
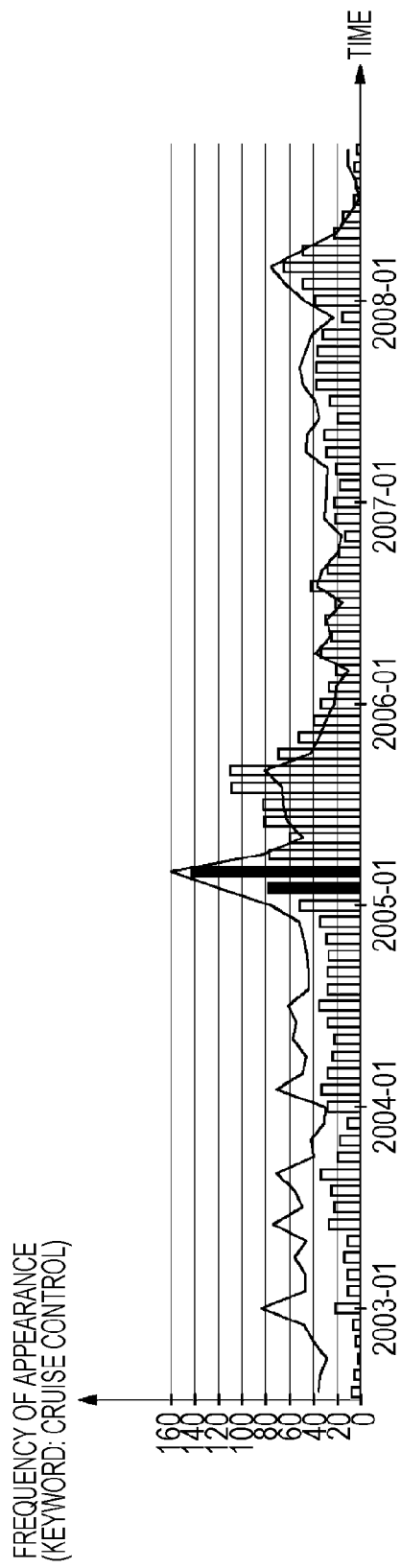
FIG. 3 is a graph illustrating an example of changes in the rate of increase in the frequency of an analysis target keyword "cruise control".

FIG. 3 is a graph illustrating an example of changes in the rate of increase in the frequency of the analysis target keyword ("cruise control"), which is calculated by the text mining section 110 in S108. The vertical axis of the graph indicates the frequency of appearance (the number of appearances), and the horizontal axis indicates the date of execution of text mining.

A plurality of product reports to be subjected to text mining of the text mining section 110 differ depending on the date of execution of text mining. Therefore, the frequency of appearance of the keyword "cruise control" that appears in the product reports differs depending on the date. For example, when the frequency increases greatly to exceed the threshold value, as shown in the vicinity of 2005 January in FIG. 3, the text mining section 110 advances the process from S108 to S110 in FIG. 2.

Figure 4:
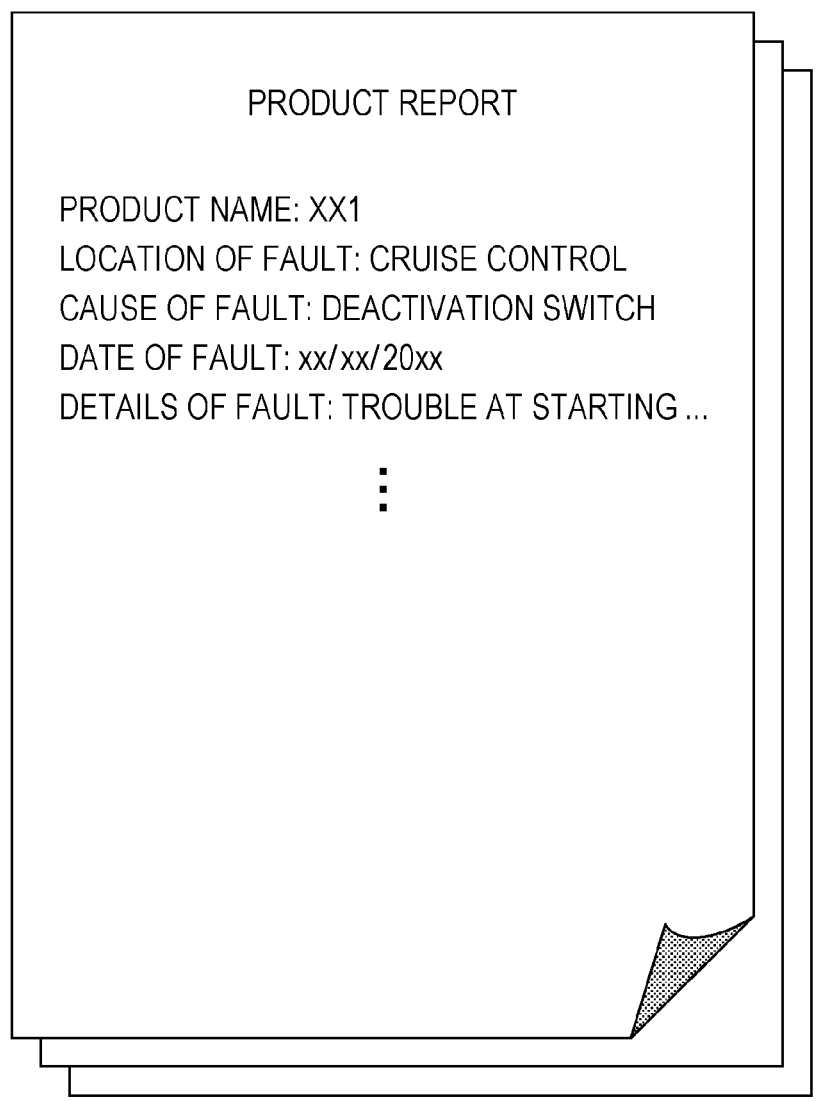
FIG. 4 is a diagram illustrating an example of a product report stored in an external database 2.
Figure 5:
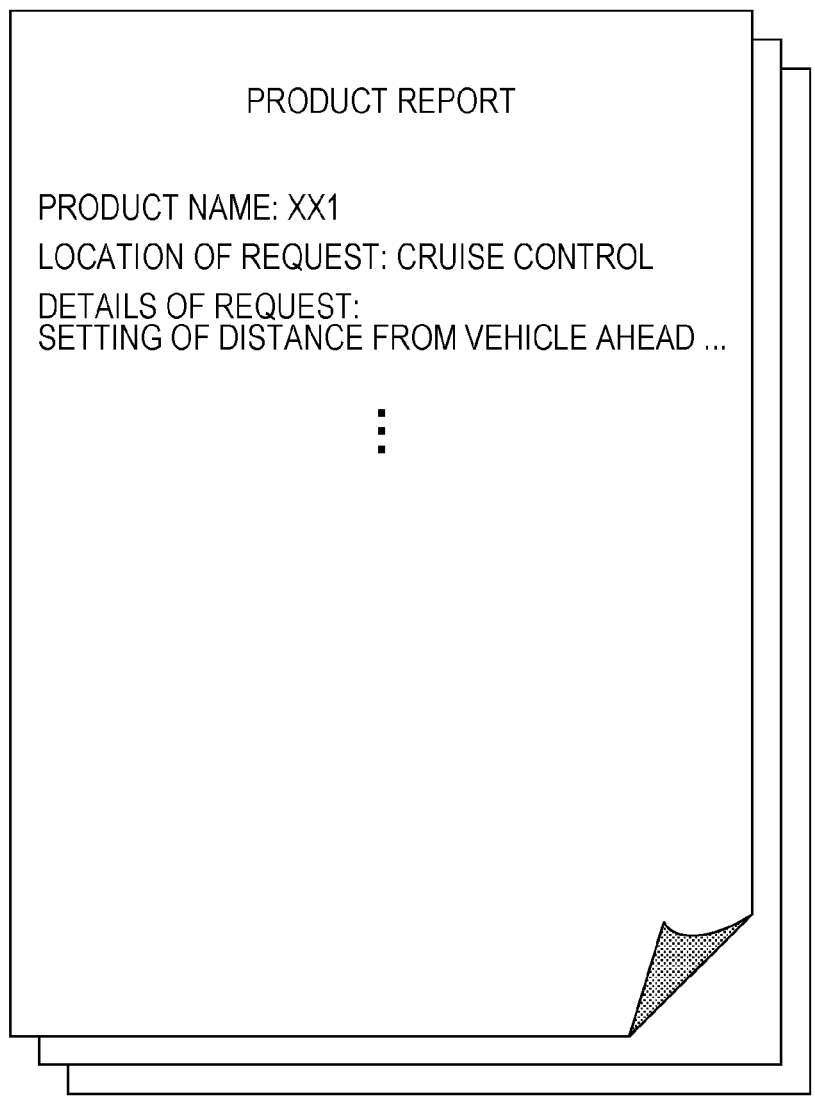
FIG. 5 is a diagram illustrating an example of a product report stored in the external database 2.

FIG. 4 and FIG. 5 show examples of the product reports stored in the external database 2, on which the text mining section 110 performs text mining in S110. As shown in FIG. 4, the external database 2 may store information, such as product name and the fault of the product, as a product report. As shown in FIG. 5, the external database 2 may store information, such as product name and a request for the product, as a product report. This allows the information processing apparatus 10 of this embodiment to analyze faults of the product and/or requests for the product accumulated in a support department or the like of the manufacturer in association with the development database 3.

The external database 2 may store text data on the Internet in place of/addition to the product reports. For example, the external database 2 may store documents acquired from a news site, a blog site, a social network service, and/or a microblog site. This allows the information processing apparatus 10 of this embodiment to analyze the reputation of the product on the Internet in association with the development database 3.

FIG. 6 shows an example of information that the text mining section 110 provides to the identification section 124 in the first process of S110. As shown in FIG. 6, the text mining section 110 provides the identification section 124 with the analysis target keyword ("cruise control"), trend index (10.3059) indicating the rate of increase in the frequency of the keyword, and relevant keywords ("XX1", "XX2", "YY1", and "YY2") obtained by text mining using the analysis target keyword.

Figure 7:
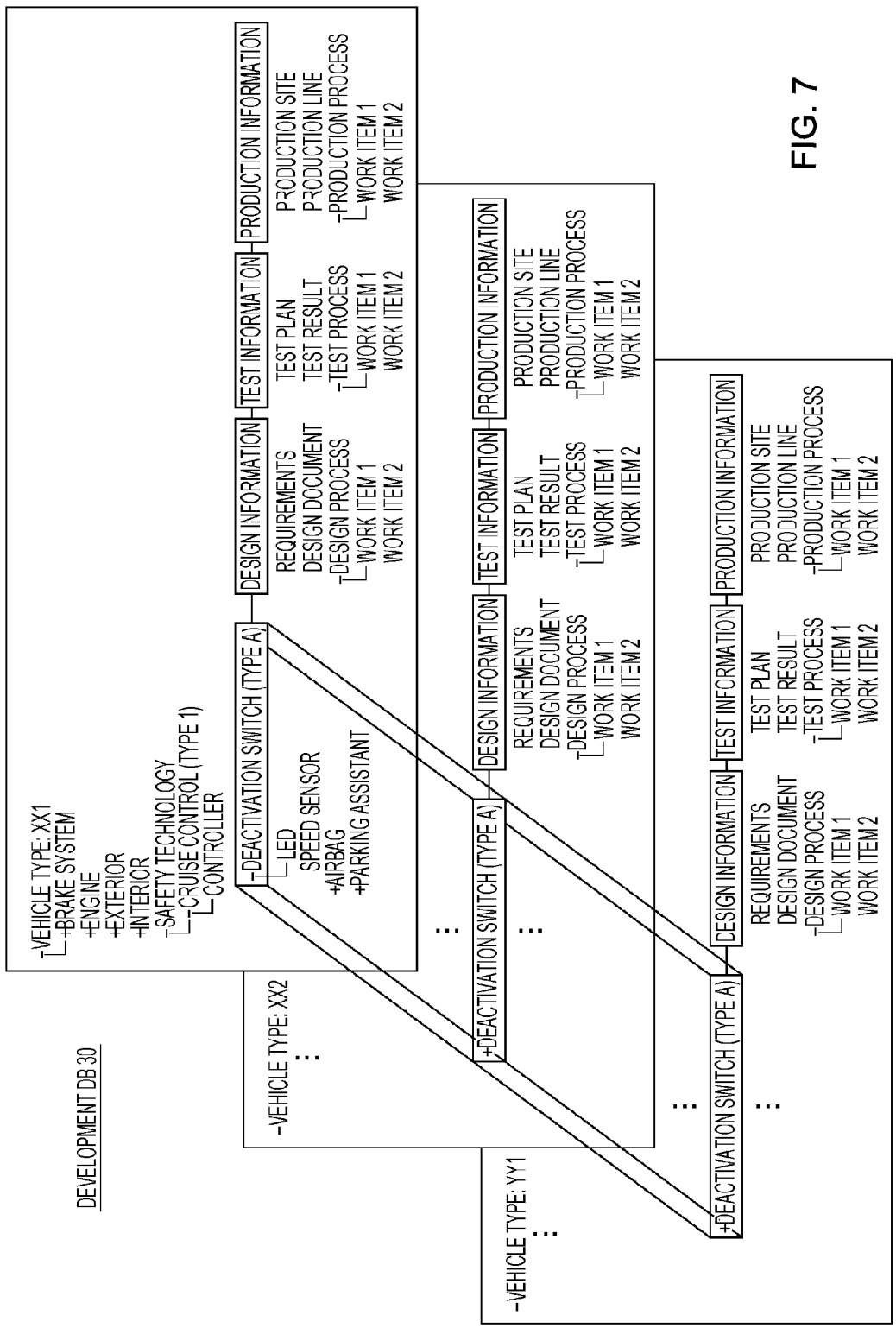
FIG. 7 is a diagram illustrating an example of a development database 3 that an identification section 124 searches.
Figure 8:
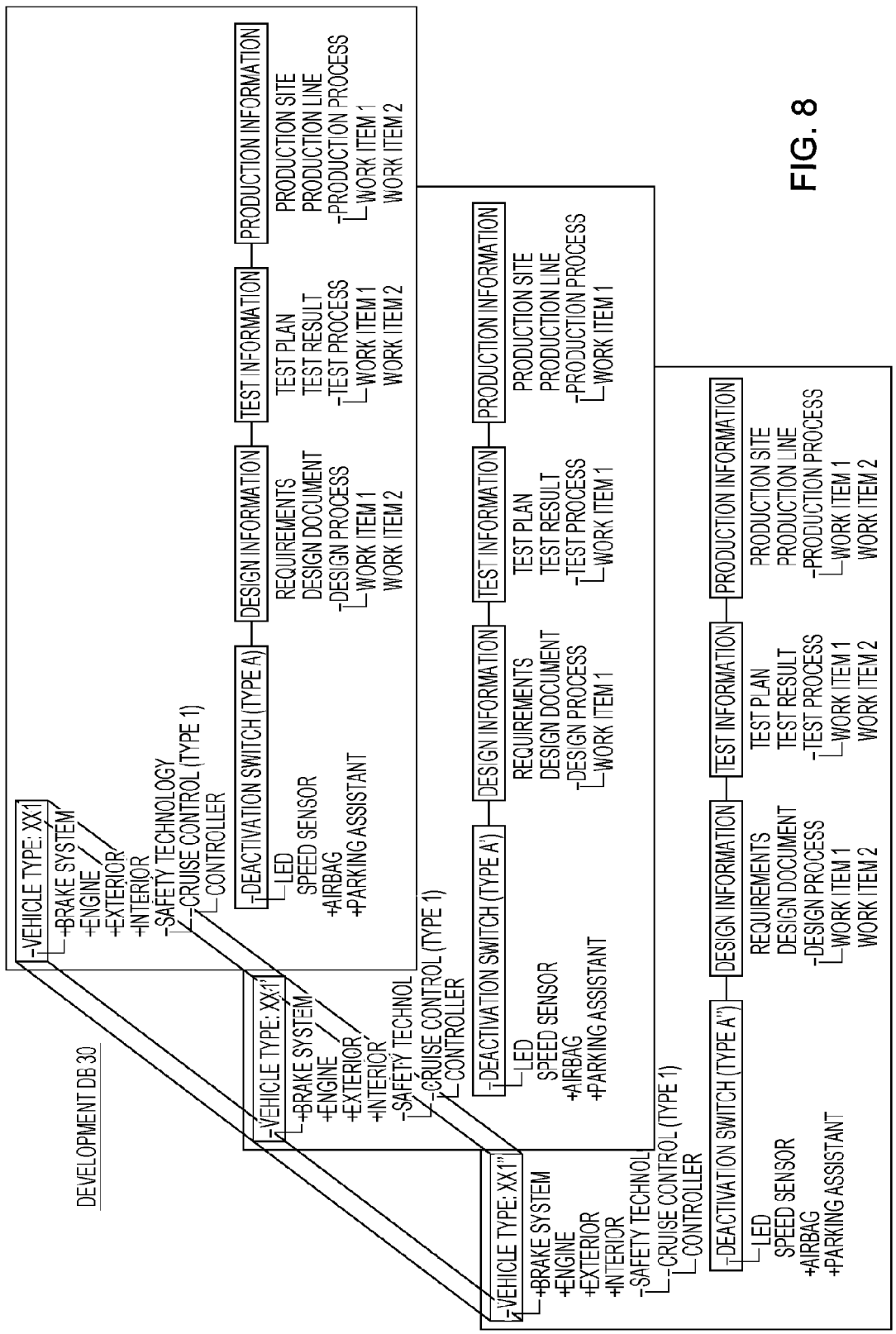
FIG. 8 is a diagram illustrating an example of the development database 3 that the identification section 124 searches.

FIG. 7 and FIG. 8 show examples of the development database 3 that the identification section 124 searches in S112. As shown in FIG. 7, the development database 3 stores the relationship between elements, such as parts constituting the product, and elements constituting the elements in a hierarchical structure or a graphical structure.

If element information is stored in the hierarchical structure, the development database 3 stores information on the layers in which individual elements are disposed in association with the elements. If element information is stored in the graphical structure, the development database 3 stores information on edges formed between individual elements in association with the elements.

For example, the development database 3 may store brake system, engine, exterior, interior, and safety technology as higher-level elements of a product of vehicle type XX1, may store cruise control, airbag, and parking assistant as intermediate-level elements that constitute the element "safety technology", may store controller, deactivation switch (type A), and speed sensor as lower-level elements that constitute the element "cruise control", and may store "LED" as a lower-layer element that constitutes "deactivation switch (type A)".

As shown in FIG. 7, the development database 3 stores information about the design, production, testing, and so on of individual elements. For example, the development database 3 stores, as design information on the deactivation switch (type A), design requirements, design document, and design process including work items for the element.

The development database 3 may store, as test information on the deactivation switch (type A), test plan, test result, and test process including work items for the element. The development database 3 may store, as production information on the deactivation switch (type A), production site, production line, manufacturer, production date, production time, and production process including work items for the element.

The development database 3 stores the relationship among elements common to a plurality of products in a graphical structure. For example, as shown in FIG. 7, the development database 3 stores the element "deactivation switch (type A)" of vehicle type XX1, the element "deactivation switch (type A)" of vehicle type XX2, and the element "deactivation switch (type A)" of vehicle type YY1 in association with one another.

The development database 3 stores the relationship between elements, such as parts constituting the product, and the elements of another product corresponding to the elements in a graphical structure. For example, as shown in FIG. 8, the development database 3 stores the deactivation switch (type A) of the vehicle type XX1, a deactivation switch (type A') included in a vehicle type XX1', which is the next-generation product of the vehicle type XX1 and which is improved from the deactivation switch (type A), and a deactivation switch (type A") included in a vehicle type XX1", which is the next-generation product of the vehicle type XX1' and which is further improved from the deactivation switch (type A'), in association with one another.

The development database 3 may be created when the product is designed; first, data on the design, production, and so on of higher-level elements of the product (for example, "brake system" and "engine" of a vehicle) may be created, and then data on lower-layer elements (for example, parts constituting "engine") may be created.

Figure 9:
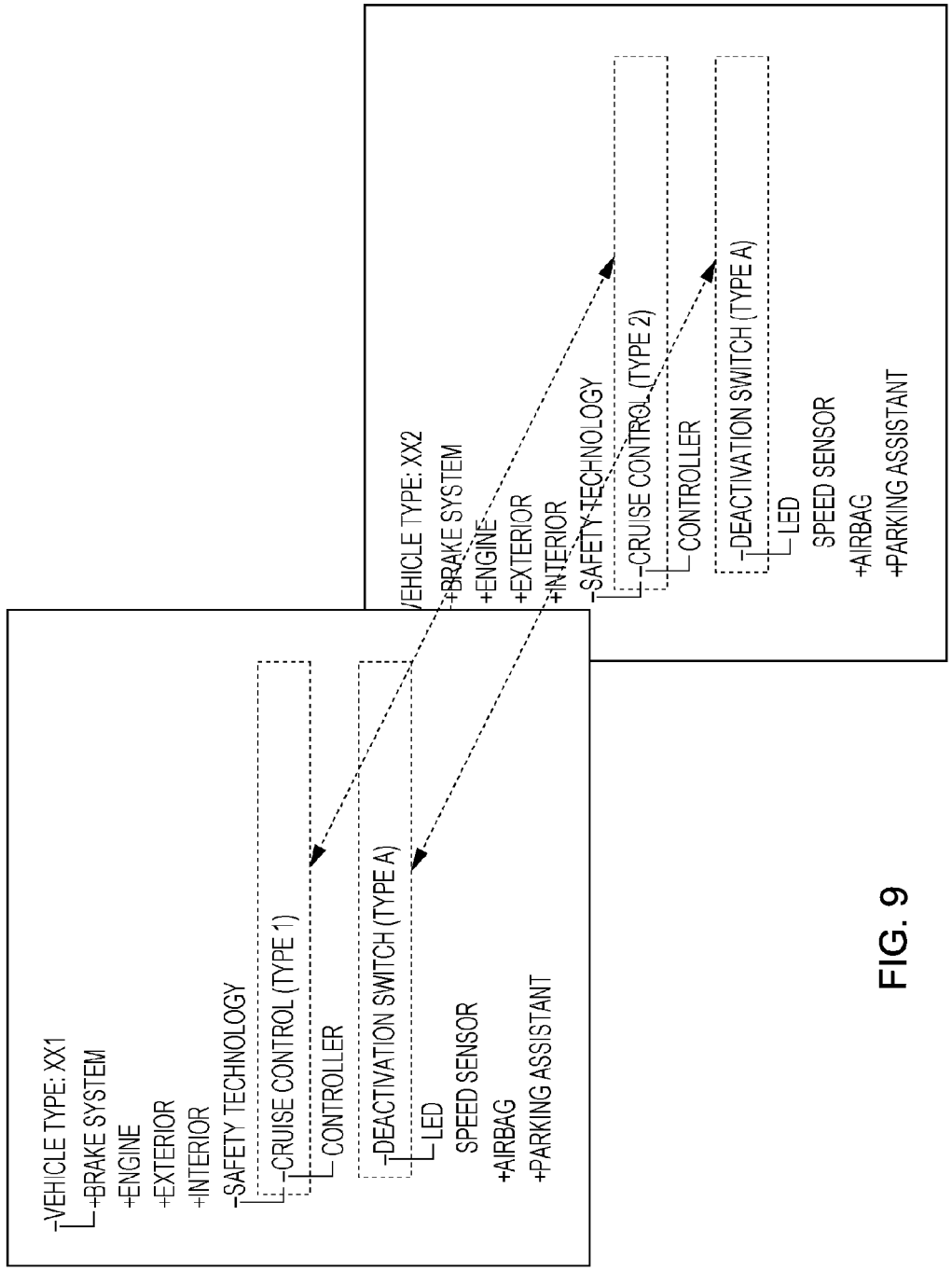
FIG. 9 is a diagram illustrating examples of elements that the identification section 124 identifies.

FIG. 9 shows examples of the elements that the identification section 124 identifies in S112. For example, in S112, the identification section 124 receives information that the text mining section 110 extracted ("vehicle type XX1" and "vehicle type XX2") and identifies "deactivation switch (type A)" common to "vehicle type XX1" and "vehicle type XX2" in the development database 3.

In the process of S112, if the part corresponding to the element that the identification section 124 identified is used in two or more products, the setting section 130 may add a corresponding element of the other product as an analysis target keyword. For example, if the identification section 124 identifies "cruise control (type 1)" in the vehicle type XX1, corresponding "cruise control (type 2)" in the vehicle type XX2 may be added to the analysis target keyword.

FIG. 10 shows an example of information that the text mining section 110 provides to the identification section 124 in the second process of S110. As shown in FIG. 10, the text mining section 110 provides the identification section 124 with the analysis target keywords ("cruise control" and "deactivation switch") and relevant keywords ("XX1", "XX2", "YY1", "YY2", "deactivation", "no light emission", "fire", and so on) obtained by text mining using the analysis target keywords.

Furthermore, as shown in FIG. 10, text mining section 110 may calculate the frequency of appearance of the relevant keywords together with the analysis target keywords (for example, 9.5% for "no light emission") and may provide the frequency to the identification section 124. Thus, the identification section 124 may identify an element from the development database 3 by using a relevant keyword weighted on the basis of the frequency of appearance. For example, the identification section 124 may identify an element, with more importance attached to a relevant keyword having higher frequency of appearance than the other relevant keywords.

With the information processing apparatus 10 of this embodiment, since the text mining section 110 updates the analysis target keyword every processing cycle, as described above, an element related to a problem or the like can be identified more accurately on the basis of the development data.

Figure 11:
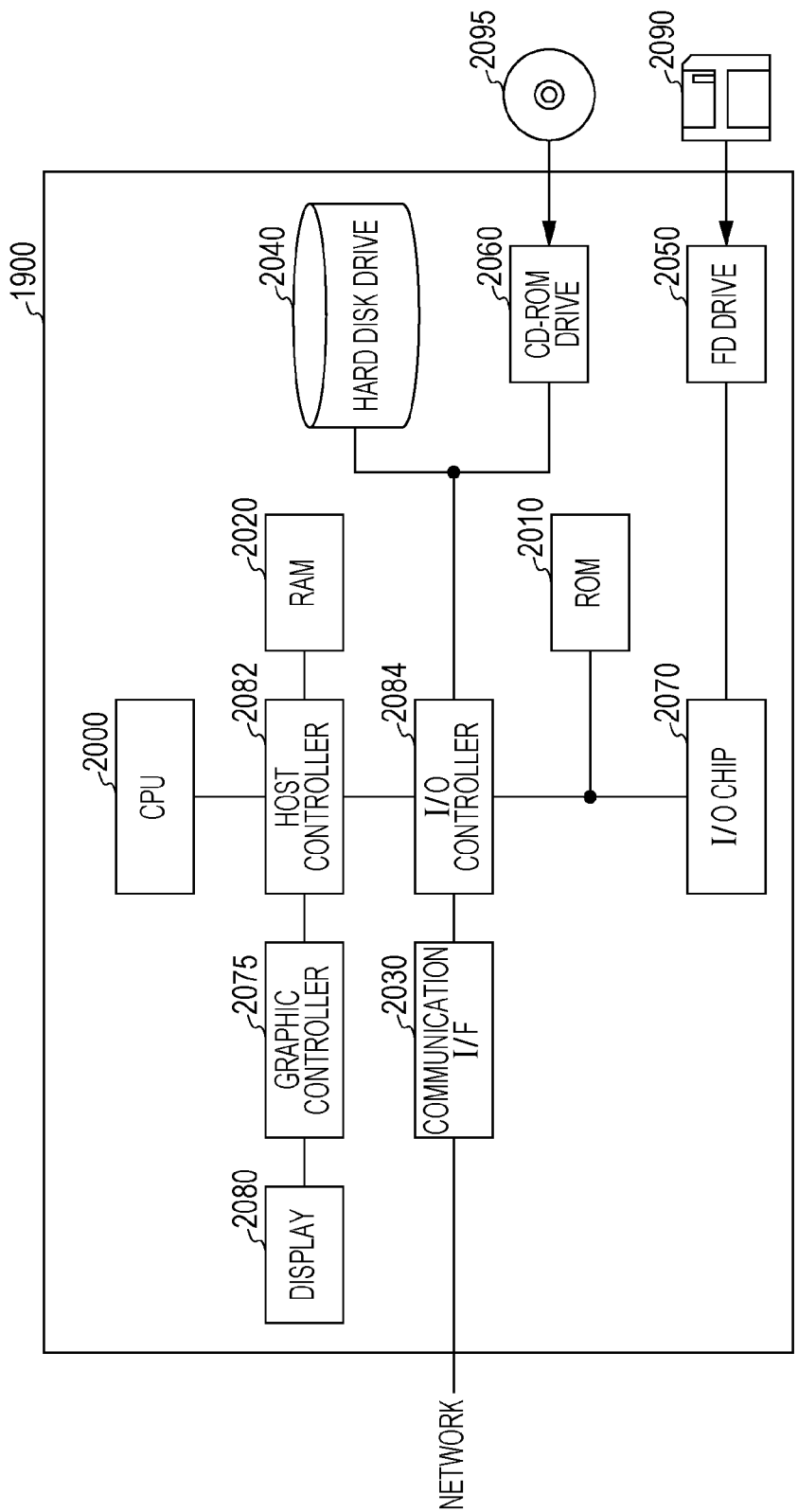
FIG. 11 is a diagram illustrating an exemplary hardware configuration of a computer 1900.

FIG. 11 shows an exemplary hardware configuration of a computer 1900 serving as the information processing apparatus 10. The computer 1900 according to this embodiment includes CPU peripherals including a CPU 2000, a RAM 2020, a graphic controller 2075, and a display 2080, which are mutually connected by a host controller 2082; an input/output section including a communication interface 2030, a hard disk drive 2040, and a CD-ROM drive 2060, which are connected to the host controller 2082 via an input/output controller 2084; a legacy input/output section including a ROM 2010, a flexible disk drive 2050, and an input/output chip 2070, which are connected to the input/output controller 2084.

The host controller 2082 connects the RAM 2020, the CPU 2000 that accesses the RAM 2020 at a high transfer rate, and the graphic controller 2075. The CPU 2000 operates on the basis of programs stored in the ROM 2010 and the RAM 2020 to control the individual components.

The graphic controller 2075 acquires image data that the CPU 2000 and so on generate on a frame buffer provided in the RAM 2020 and displays the image data on the display 2080. Alternatively, the graphic controller 2075 may include a frame buffer that stores image data generated by the CPU 2000 and so on.

The input/output controller 2084 connects the host controller 2082 and the communication interface 2030, the hard disk drive 2040, and the CD-ROM drive 2060, which are relatively high-speed input/output devices. The communication interface 2030 communicates with another device via a network by wire or wirelessly.

Furthermore, the communication interface 2030 functions as hardware for communication in the analysis processing unit 100 and the project managing unit 200. The hard disk drive 2040 stores programs and data that the CPU 2000 in the computer 1900 uses. The CD-ROM drive 2060 reads a program or data from a CD-ROM 2095 and provides it to the hard disk drive 2040 via the RAM 2020.

The ROM 2010, the flexible disk drive 2050, and the input/output chip 2070, which are relatively low-speed input/output devices, are connected to the input/output controller 2084. The ROM 2010 stores a boot program that the computer 1900 executes at starting and/or programs that depend on the hardware of the computer 1900, and so on. The flexible disk drive 2050 reads a program or data from a flexible disk 2090 and provides it to the hard disk drive 2040 via the RAM 2020. The input/output chip 2070 connects the flexible disk drive 2050 to the input/output controller 2084 and connects various input/output devices to the input/output controller 2084 via, for example, a parallel port, a serial port, a keyboard port, or a mouse port.

The program provided to the hard disk drive 2040 via the RAM 2020 is stored in a recording medium, such as the flexible disk 2090, the CD-ROM 2095, and an IC card, and is provided by the user. The program is read from the recording medium, is installed in the hard disk drive 2040 in the computer 1900 via the RAM 2020, and is executed in the CPU 2000.

The program installed in the computer 1900 for causing the computer 1900 to function as the information processing apparatus 10 includes an analytical processing module, a text mining module, a development-database processing module, an acquisition module, an identification module, a setting module, a notification module, and a project managing module.

The program or modules may work the CPU 2000 or the like to cause the computer 1900 to function as the analysis processing unit 100, the text mining section 110, the development-database processing unit 120, the acquisition section 122, the identification section 124, the setting section 130, the notification section 140, and the project managing unit 200.

Information processing described in the program is read by the computer 1900 and functions as actual means in which software and the various hardware resources described above cooperate, that is, the analysis processing unit 100, the text mining section 110, the development-database processing unit 120, the acquisition section 122, the identification section 124, the setting section 130, the notification section 140, and the project managing unit 200. The information processing apparatus 10 suitable for intended use is established by these actual means implementing calculation or processing of information according to the intended use of the computer 1900 of this embodiment.

For example, for communication between the computer 1900 and an external device or the like, the CPU 2000 executes a communication program loaded on the RAM 2020 to instruct the communication interface 2030 to perform communication processing on the basis of the processing details described in the communication program.

The communication interface 2030 reads transmission data stored in a transmission buffer area or the like provided on a storage unit, such as the RAM 2020, the hard disk drive 2040, the flexible disk 2090, and the CD-ROM 2095, under the control of the CPU 2000, transmits the transmission data to the network or writes reception data received from the network to a reception buffer area or the like provided on the storage unit.

The communication interface 2030 may transfer transmission or reception data to/from a storage unit by direct memory access (DMA), as described above, or alternatively, the CPU 2000 may read data from a storage unit of a transfer source or the communication interface 2030 and write the data to the destination communication interface 2030 or storage unit to thereby transfer the transmission or reception data.

The CPU 2000 reads all or necessary part of a file or a database stored in an external storage unit, such as the hard disk drive 2040, the CD-ROM drive 2060 (CD-ROM 2095), and the flexible disk drive 2050 (flexible disk 2090) into the RAM 2020 by DMA transfer or the like and performs various processes on the data on the RAM 2020.

The external database 2 and the development database 3 may be installed in the external storage units. The CPU 2000 writes back the processed data to the external storage units by DMA transfer or the like. Since the RAM 2020 seems to temporarily store the content in the external storage units in such a process, the RAM 2020 and the external storage units in this embodiment are generally referred to as memories, storages, or storage units.

Various items of information in this embodiment, such as programs, data, tables, and databases, are stored on such storage units and are subjected to information processing. The CPU 2000 can also store part of the content of the RAM 2020 in a cache memory and can write and read the cache memory. Since the cache memory takes part of the function of the RAM 2020 also in such a case, the cache memory is also included in the RAM 2020, a memory, and/or a storage unit in this embodiment except a case where it is distinguished therefrom.

Furthermore, the CPU 2000 performs, on data read from the RAM 2020, various processes including calculations, information processing, determination of conditions, search for information, and replacement of information described in this embodiment, designated by instruction sequences of programs, and writes back the data to the RAM 2020. For example, for determination of conditions, the CPU 2000 determines whether various variables shown in this embodiment satisfy a condition, such as being larger, smaller, greater than or equal to, and less than or equal to another variable or constant, and if the condition is satisfied (or not satisfied), the CPU 2000 goes to a different instruction sequence or call a subroutine.

Furthermore, the CPU 2000 can search for information stored in a file, a database, or the like in a storage unit. For example, in the case where a plurality of entries in which a second attribute value is associated with a first attribute value are stored in a storage unit, the CPU 2000 finds an entry whose first attribute value matches a designated condition from the plurality of entries stored in the storage unit and reads a second attribute value stored in the entry to thereby obtain a second attribute value associated with a first attribute value that satisfies a predetermined condition.

The program or modules described above may be stored in an external recording medium. Examples of the recording medium include optical recording media, such as a DVD and a CD, a magnetooptical recording medium, such as an MO, a tape medium, and a semiconductor memory, such as an IC card, in addition to the flexible disk 2090 and the CD-ROM 2095. The program may be provided to the computer 1900 via a network using a storage unit, such as a hard disk and a RAM, provided in a server system connected to a dedicated communication network or the Internet, as a recording medium.

Thus, as described herein an according to a first aspect of the present invention, provided are an information processing apparatus including a text mining section configured to perform text mining on text data acquired from the outside and to output extracted information; an identification section configured to search a development database storing elements constituting a product and the relationship among the elements by using the information extracted by text mining to identify an element related to the information; and a notification section configured to notify the identified element to a user, a program for use in the information processing apparatus, and a method for information processing using the information processing apparatus.

According to a second aspect of the present invention, provided are an information processing apparatus including an acquisition section configured to acquire at least one element from development database storing elements constituting a product and the relationship among the elements; a setting section configured to set the acquired element as an analysis target keyword for text mining; a text mining section configured to perform text mining on externally acquired text data by using the analysis target keyword to extract information related to the element acquired from the development database; and a notification section configured to notify a user of the information related to the element acquired by text mining in association with the element acquired from the development database, a program for use in the information processing apparatus, and a method for information processing using the information processing apparatus.

Note that the outline of the present invention described above does not include all necessary features of the present invention and that a sub-combination of these features can also be the present invention.

Although the present invention has been described using an embodiment, the technical scope of the present invention is not limited to the scope of the embodiment. It will be obvious to those skilled in the art that various changes and modifications of the embodiment may be made. It will also be obvious from the scope of the invention that such changes and modifications are also included in the technical scope of the present invention.

It is to be understood that the processes, such as the operations, procedures, steps, and stages of the devices, systems, programs, and methods shown in the Claims, specification, and drawings, can be achieved in any execution sequence, unless otherwise specified, such as "before" and "prior to", and unless the output of previous processing is used in the following processing. Even if the scope of the Claims, the specification, and the operation procedure in the drawings are described using "first", "second", etc. for the purpose of convenience, it is not absolutely necessary to execute the operation in this order.

What is claimed is:

1. A computer system comprising one or more processors, one or more computer readable memories, and one or more computer readable storage mediums, and program instructions stored on at least one of the one or more storage mediums for execution by at least one of the one or more processors via at least one of the one or more memories, the stored program instructions comprising:

program instructions to acquire an analysis target keyword from a development database, wherein the development database stores information for a plurality of elements that include information on at least one of the design, production, testing, and support of the elements, and information on a relationship among the plurality of elements, wherein the relationship is one or more relationships from a group consisting of a connection relationship, a hierarchical relationship, a correspondence relationship, and a dependency relationship among the plurality of elements;

program instructions to perform text mining on text data acquired from an external source, wherein the text mining on the text data acquires a frequency of occurrence of the analysis target keyword in the text data during a predetermined period of time, and wherein the text data is a report that describes past failures experienced by a product;

program instructions to perform additional text mining on the text data acquired from the external source, wherein the additional text mining identifies connection relationships, hierarchical relationships, and dependency relationships among a plurality of components of the product according to the information stored in the development database;

program instructions to calculate a rate of increase in a frequency of the analysis target keyword appearing in the text data acquired from the external source;

program instructions to, in response to the rate of increase in the frequency being higher than a threshold value, acquire a related keyword from the text data;

program instructions to identify a first faulty component of the product based on the text mining acquiring the frequency of occurrence of the analysis target keyword in the text data and based on the additional text mining extracting the related keyword from the text data;

program instructions to adjust a design of the product based on the identified first faulty component, wherein adjusting the design of the product results in an adjusted design that overcomes problems caused by the identified first faulty component; and program instructions to produce the product according to the adjusted design.

2. The computer system according to claim 1, wherein the analysis target keyword is a name of the first faulty component.

3. The computer system according to claim 1, further comprising:
program instructions to adjust a production of the product based on the identified first faulty component.

4. The computer system according to claim 1, further comprising:
program instructions to adjust a testing of the product based on the identified first faulty component.

5. The computer system according to claim 1, further comprising:
program instructions to identify other products that use the identified first faulty component; and
program instructions to adjust a design of the other products based on the identified first faulty component.

6. The computer system according to claim 1, wherein the related keyword is a name of the first faulty component.

7. The computer system according to claim 1, further comprising:
program instructions to identify a second faulty component of the product based on the text mining of the text data;
program instructions to establish a ranking of the first faulty component against the second faulty component, wherein the ranking is based on a level of impact on a safety of the product caused by the first faulty component or the second faulty component;
program instructions to adjust a design of the product based on the ranking of the first faulty component and the second faulty component, wherein adjusting the design results in an adjusted design; and
program instructions to produce the product according to the adjusted design.

8. The computer system according to claim 1, wherein the external source is a combination of a news website, a social network webpage, a web log (blog) webpage, and a microblog webpage.

9. The computer system according to claim 1, further comprising:
program instructions to graph a hierarchical relationship between the analysis target keyword and the related keyword.

10. The computer system according to claim 1, further comprising:
program instructions to further identify the analysis target keyword based on the analysis target keyword occurring in the external source at a frequency that increases at a rate of increase that exceeds a predetermined threshold value.

11. A computer program product comprising one or more computer readable storage mediums, and program instructions stored on at least one of the one or more storage mediums, the stored program instructions comprising:
program instructions to acquire an analysis target keyword from a development database, wherein the development database stores information for a plurality of elements that include information on at least one of the design, production, testing, and support of the elements, and information on a relationship among the plurality of elements, wherein the relationship is one or more relationships from a group consisting of a connection relationship, a hierarchical relationship, a correspondence relationship, and a dependency relationship among the plurality of elements;
program instructions to perform text mining on text data acquired from an external source, wherein the text mining on the text data acquires a frequency of occurrence of the analysis target keyword in the text data during a predetermined period of time, and wherein the text data is a report that describes past failures experienced by a product;
program instructions to perform additional text mining on the text data acquired from the external source, wherein the additional text mining identifies connection relationships, hierarchical relationships, and dependency relationships among a plurality of components of the product according to the information stored in the development database;
program instructions to calculate a rate of increase in a frequency of the analysis target keyword appearing in the text data acquired from the external source;
program instructions to, in response to the rate of increase in the frequency being higher than a threshold value, acquire a related keyword from the text data;
program instructions to identify a first faulty component of the product based on the text mining acquiring the frequency of occurrence of the analysis target keyword in the text data and based on the additional text mining extracting the related keyword from the text data;
program instructions to adjust a design of the product based on the identified first faulty component, wherein adjusting the design of the product results in an adjusted design that overcomes problems caused by the identified first faulty component; and
program instructions to produce the product according to the adjusted design.

12. A method comprising:
acquiring, by one or more processors, an analysis target keyword from a development database, wherein the development database stores information for a plurality of elements that include information on at least one of the design, production, testing, and support of the elements, and information on a relationship among the plurality of elements, wherein the relationship is one or more relationships from a group consisting of a connection relationship, a hierarchical relationship, a correspondence relationship, and a dependency relationship among the plurality of elements;
performing, by one or more processors, text mining on text data acquired from an external source, wherein the text mining on the text data acquires a frequency of occurrence of the analysis target keyword in the text data during a predetermined period of time, and wherein the text data is a report that describes past failures experienced by a product;
performing, by one or more processors, additional text mining on the text data acquired from the external source, wherein the additional text mining identifies connection relationships, hierarchical relationships, and dependency relationships among a plurality of components of the product according to the information stored in the development database;
calculating, by one or more processors, a rate of increase in a frequency of the analysis target keyword appearing in the text data acquired from the external source;
in response to the rate of increase in the frequency being higher than a threshold value, acquiring, by one or more processors, a related keyword from the text data;
identifying, by one or more processors, a first faulty component of the product based on the text mining acquiring the frequency of occurrence of the analysis target keyword in the text data and based on the additional text mining extracting the related keyword from the text data;

adjusting, by one or more processors, a design of the product based on the identified first faulty component, wherein adjusting the design of the product results in an adjusted design that overcomes problems caused by the identified first faulty component; and producing the product according to the adjusted design.

13. The method according to claim 12, further comprising:

identifying, by one or more processors, other products that use the identified first faulty component; and adjusting, by one or more processors, a design of the other products based on the identified first faulty component.

14. The method according to claim 12, further comprising:

identifying, by one or more processors, a second faulty component of the product based on the text mining of the text data;

establishing, by one or more processors, a ranking of the first faulty component against the second faulty component, wherein the ranking is based on a level of impact on a safety of the product caused by the first faulty component or the second faulty component; and adjusting, by one or more processors, a design of the product based on the ranking of the first faulty component and the second faulty component.

* * * * *